US010621176B2

(12) United States Patent
Yam et al.

(10) Patent No.: US 10,621,176 B2
(45) Date of Patent: Apr. 14, 2020

(54) AUTOMATIC RECONFIGURATION OF RELOCATED PLUGGABLE DATABASES

(71) Applicant: Oracle International Corporation, Redwood Shores, CA (US)

(72) Inventors: Philip Yam, San Franciso, CA (US); Kumar Rajamani, San Ramon, CA (US); Jaebock Lee, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 603 days.

(21) Appl. No.: 15/266,030

(22) Filed: Sep. 15, 2016

(65) Prior Publication Data

US 2017/0116235 A1      Apr. 27, 2017

Related U.S. Application Data

(60) Provisional application No. 62/245,937, filed on Oct. 23, 2015.

(51) Int. Cl.
*G06F 16/172* (2019.01)
*G06F 16/2455* (2019.01)
(Continued)

(52) U.S. Cl.
CPC ...... *G06F 16/24566* (2019.01); *G06F 16/172* (2019.01); *G06F 16/214* (2019.01); *G06F 16/258* (2019.01)

(58) Field of Classification Search
CPC ............. G06F 16/24566; G06F 16/214; G06F 16/258; G06F 16/172
(Continued)

(56) References Cited

U.S. PATENT DOCUMENTS 6,804,671 B1    10/2004    Loaiza et al.
7,031,987 B2    4/2006    Mukkamalla et al.
(Continued)

OTHER PUBLICATIONS

Oracle, "White Paper for Oracle Multitenant", Jun. 2013, pp. 1-48 (Year: 2013).*
(Continued)

*Primary Examiner* — Alex Gofman
*Assistant Examiner* — Kamal K Dewan
(74) *Attorney, Agent, or Firm* — Hickman Palermo Becker Bingham LLP

(57) ABSTRACT

A database server instance automatically detects configuration issues when a pluggable database (PDB) is plugged into a new destination container database (CDB). The database server instance identifies one or more update templates, within the destination CDB, that, when run over the relocated PDB, will update the configuration of the PDB to conform to the configuration of the destination CDB. Instead of requiring an administrator to initiate update scripts from a DBMS kernel to reconfigure a PDB, the DBMS creates the update templates by recording commands run within PDBs in connection with system updates. These recorded update templates may then be run over relocated PDBs, to configure the PDBs according to the configuration of the destination CDB. Further, the update templates may be pre-recorded update templates, which record commands to perform configuration updates, to PDBs, that have never before been performed within the CDB.

16 Claims, 9 Drawing Sheets

(51) Int. Cl.
  *G06F 16/25* (2019.01)
  *G06F 16/21* (2019.01)
(58) Field of Classification Search
  USPC .......................................................... 707/609
  See application file for complete search history.

(56) References Cited

U.S. PATENT DOCUMENTS

| | | | |
|---|---|---|---|
| 7,571,173 | B2 | 8/2009 | Yang et al. |
| 7,822,717 | B2 | 10/2010 | Kappor et al. |
| 8,335,767 | B2 | 12/2012 | Das et al. |
| 8,364,648 | B1 | 1/2013 | Sim-Tang |
| 8,554,806 | B2 | 10/2013 | Hu et al. |
| 8,600,977 | B2 | 12/2013 | Dageville et al. |
| 9,003,109 | B1 | 4/2015 | Lam |
| 9,189,522 | B2 | 11/2015 | Das et al. |
| 2002/0112022 | A1 | 8/2002 | Kazar et al. |
| 2003/0061537 | A1 | 3/2003 | Cha et al. |
| 2004/0002996 | A1* | 1/2004 | Bischof ............... G06F 11/3688 |
| 2004/0267809 | A1 | 12/2004 | East et al. |
| 2005/0038831 | A1* | 2/2005 | Souder ............... G06F 16/2386 |
| 2005/0187897 | A1 | 8/2005 | Pawar et al. |
| 2006/0123009 | A1 | 6/2006 | Bruno |
| 2006/0179116 | A1* | 8/2006 | Speeter ..................... G06F 8/71 |
| | | | 709/217 |
| 2006/0206507 | A1 | 9/2006 | Dahbour |
| 2007/0100912 | A1 | 5/2007 | Pareek et al. |
| 2007/0244918 | A1 | 10/2007 | Lee et al. |
| 2008/0016123 | A1 | 1/2008 | Devraj et al. |
| 2008/0162491 | A1* | 7/2008 | Becker .................. G06F 16/275 |
| 2009/0204570 | A1 | 8/2009 | Wong |
| 2010/0036788 | A1 | 2/2010 | Wu |
| 2010/0318570 | A1 | 12/2010 | Narasinghanallur et al. |
| 2011/0004586 | A1 | 1/2011 | Cherryholmes et al. |
| 2011/0060724 | A1 | 3/2011 | Chan |
| 2011/0087633 | A1 | 4/2011 | Kreuder et al. |
| 2011/0126197 | A1 | 5/2011 | Larsen et al. |
| 2011/0307450 | A1 | 12/2011 | Hahn et al. |
| 2012/0109926 | A1 | 5/2012 | Novik et al. |
| 2012/0173717 | A1 | 7/2012 | Kohli |
| 2013/0085742 | A1 | 4/2013 | Baker et al. |
| 2013/0117237 | A1 | 5/2013 | Thomsen et al. |
| 2013/0132349 | A1* | 5/2013 | Hahn .................. G06F 16/2282 |
| | | | 707/649 |
| 2013/0212068 | A1 | 8/2013 | Talius et al. |
| 2013/0290506 | A1* | 10/2013 | Astete ................. G06F 9/45533 |
| | | | 709/223 |
| 2014/0095452 | A1 | 4/2014 | Lee et al. |
| 2014/0095530 | A1* | 4/2014 | Lee ..................... G06F 11/1471 |
| | | | 707/769 |
| 2014/0095546 | A1 | 4/2014 | Kruglikov et al. |
| 2014/0164331 | A1 | 6/2014 | Li et al. |
| 2014/0304229 | A1 | 10/2014 | Zhu |
| 2015/0254240 | A1 | 9/2015 | Li et al. |
| 2015/0347401 | A1 | 12/2015 | Raghavan |
| 2015/0363435 | A1 | 12/2015 | Ott |
| 2017/0109386 | A1 | 4/2017 | Baer |
| 2019/0102384 | A1 | 4/2019 | Hung et al. |
| 2019/0102411 | A1 | 4/2019 | Hung et al. |

OTHER PUBLICATIONS

U.S. Appl. No. 13/631,815, filed Sep. 28, 2012, Office Action, dated Nov. 6, 2014.
U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed Sep. 28, 2012, Office Action, dated Dec. 23, 2013.
U.S. Appl. No. 13/631,815, filed Sep. 28, 2012, Office Action, dated May 29, 2014.
Rajeev Kumar et al., ORACLE DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud," 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Baer, U.S. Appl. No. 15/228,831, filed Aug. 4, 2016, Office Action, dated Jul. 13, 2018.
Kumar, Gauraw: "Learning About Exchange Partition Mechanism—Oracle", dated Feb. 22, 2015, 8 pages.
Gey et al., "Evolving Multi-tenant SaaS Applications through Self-Adaptive Upgrade Enactment and Tenant Mediation", SEAMS'16 May 16-17, 2016, Austin, TX, USA 2016 AC, 7 pages.
Zisman et al., "An approach to interoperation between autonomous database systems", Distrib. Syst. Engng 6 (1999) 135-148. Printed in the UK, 15 pages.
Weishar et al., "An Intelligent Heterogeneous Autonomous Database Architecture for Semantic Heterogeneity Support", IEEE Workshop on Interoperability in Multidatabase Systems, dated Apr. 1991, 9 pgs.
Rodd et al., "Adaptive Tuning Algorithm for Performance tuning of Database Management System", (IJCSIS) International Journal of Computer Science Information Security, vol. 8, No. 1, Apr. 2010, 4pgs.
Pavlo, "Self-Driving Database Management Systems", 8th Biennial Conference on Innovative Data Systems Research (CIDR '17), Jan. 8-11, 2017, Chaminade, California, USA, 6 pages.
Maenhaut et al., "Design and Evaluation of a Hierarchical Multi-Tenant Data Management Framework for Cloud Applications", dated 2015, 6 pages.
Das et al., "Scalable and Elastic Transactional Data Stores for Cloud Computing Platforms", dated Dec. 2011, 302 pages.
Das et al., "Automated Demand-Driven Resource Scaling in Relational Database-as-aService", SIGMOD'16, Jun. 26-Jul. 1, 2016, San Francisco, CA, USA, 12 pages.
Beschastnikh et al., "Machine Learning for Automatic Physical DBMS Tuning", dated Dec. 6, 2007, 6 pages.
Agrawal et al., "Database Scalability, Elasticity, and Autonomy in the Cloud", dated 2011, 14 pages.
Urbano Randy et al., "Oracle Database Administrator's Guide", 12c Release dated Jul. 31, 2017, pp. 1-1500.
Baer, U.S. Appl. No. 15/228,831, filed Aug. 4, 2016, Notice of Allowance, dated Jul. 15, 2019.
Sartain, JD, "Max Productivity", dated Feb. 17, 2015, 8 pages.
Sartain, JD, "5 Must-know Excel Macros for Common Tasks", dated Sep. 10, 2014, 12 pages.
Baer, U.S. Appl. No. 15/228,831, filed Aug. 4, 2016, Final Office Action, dated Jan. 8, 2019.

* cited by examiner

302
RUN A SET OF CONFIGURATION COMMANDS OVER A FIRST PLUGGABLE DATABASE WITHIN A CONTAINER DATABASE; WHEREIN RUNNING THE SET OF CONFIGURATION COMMANDS OVER THE FIRST PLUGGABLE DATABASE CHANGES THE CONFIGURATION OF THE FIRST PLUGGABLE DATABASE FROM A FIRST CONFIGURATION VERSION TO A SECOND CONFIGURATION VERSION; WHEREIN THE FIRST CONFIGURATION VERSION IS DIFFERENT FROM THE SECOND CONFIGURATION VERSION

304
IN RESPONSE TO RUNNING THE SET OF CONFIGURATION COMMANDS, RECORD THE SET OF CONFIGURATION COMMANDS INTO A CONFIGURATION CHANGE TEMPLATE

306
WHILE THE CONFIGURATION OF THE CONTAINER DATABASE CONFORMS TO THE SECOND CONFIGURATION VERSION, PLUG A SECOND PLUGGABLE DATABASE INTO THE CONTAINER DATABASE

308
AUTOMATICALLY DETECT THAT THE CONFIGURATION OF THE SECOND PLUGGABLE DATABASE CONFORMS TO THE FIRST CONFIGURATION VERSION

310
IN RESPONSE TO DETECTING THAT THE CONFIGURATION OF THE SECOND PLUGGABLE DATABASE CONFORMS TO THE FIRST CONFIGURATION VERSION, AUTOMATICALLY RUN THE CONFIGURATION CHANGE TEMPLATE OVER THE SECOND PLUGGABLE DATABASE; WHEREIN RUNNING THE CONFIGURATION CHANGE TEMPLATE OVER THE SECOND PLUGGABLE DATABASE CONFORMS THE CONFIGURATION OF THE SECOND PLUGGABLE DATABASE TO THE SECOND CONFIGURATION VERSION

FIG. 5

502
PLUG A PLUGGABLE DATABASE INTO A CONTAINER DATABASE, WHERE THE CONTAINER DATABASE IS MANAGED BY A DATABASE MANAGEMENT SYSTEM, WHILE: THE CONTAINER DATABASE IS CONFIGURED FOR A FIRST VERSION OF THE DATABASE MANAGEMENT SYSTEM, AND THE PLUGGABLE DATABASE IS CONFIGURED FOR A SECOND VERSION OF THE DATABASE MANAGEMENT SYSTEM, WHEREIN THE FIRST VERSION OF THE DATABASE MANAGEMENT SYSTEM IS A MORE RECENT VERSION THAN THE SECOND VERSION OF THE DATABASE MANAGEMENT SYSTEM;

504
AFTER PLUGGING THE PLUGGABLE DATABASE INTO THE CONTAINER DATABASE, AUTOMATICALLY DETECT THAT THE CONFIGURATION OF THE PLUGGABLE DATABASE IS DIFFERENT THAN THE CONFIGURATION OF THE CONTAINER DATABASE

506
IDENTIFY, WITHIN INFORMATION FOR THE CONTAINER DATABASE, A CONFIGURATION CHANGE TEMPLATE THAT INCLUDES COMMANDS TO CONFIGURE A PLUGGABLE DATABASE FOR THE FIRST VERSION OF THE DATABASE MANAGEMENT SYSTEM

508
RUN THE CONFIGURATION CHANGE TEMPLATE OVER THE PLUGGABLE DATABASE; WHEREIN RUNNING THE CONFIGURATION CHANGE TEMPLATE OVER THE PLUGGABLE DATABASE CONFORMS THE CONFIGURATION OF THE PLUGGABLE DATABASE FOR THE FIRST VERSION OF THE DATABASE MANAGEMENT SYSTEM

AUTOMATIC RECONFIGURATION OF RELOCATED PLUGGABLE DATABASES

CROSS-REFERENCE TO RELATED APPLICATIONS; PRIORITY CLAIM

This application claims the benefit of Provisional Appln. No. 62/245,937, filed Oct. 23, 2015 and titled "Application Containers in Container Databases", the entire contents of which is hereby incorporated by reference as if fully set forth herein, under 35 U. S. C. § 119(e).

Further, this application is related to U.S. Pat. No. 9,239,763, filed Sep. 28, 2012 and issued Jan. 19, 2016, titled "Container Database", the entire contents of which is hereby incorporated by reference as if fully set forth herein.

FIELD OF THE INVENTION

The present invention relates to pluggable databases within a container database environment and, more specifically, to automatically reconfiguring a pluggable database that has been relocated from a source container database to a destination container database that has a different configuration than the source container database.

BACKGROUND

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

Generally, in order to reconfigure a pluggable database in a particular container database, database administrators are required to run, from the DBMS kernel, update scripts over the container database. These update scripts update the configuration of the pluggable database within the container database to conform to the configuration of the container database. Many times, such update scripts require input from the administrator running the scripts, as well as access to session variables and other situation-specific information.

As such, administrator effort is required to prepare the configuration of a relocated pluggable database to ensure proper functioning of the pluggable database for the DBMS features that are applicable to the destination container database. Also, since the reconfiguration process is not automated, it is possible for administrators to inadvertently err during the reconfiguration process, which results in incorrectly configuring the relocated pluggable database. In such cases, administrators must restart the reconfiguration process to remedy resulting issues.

It would be beneficial to automate the process of reconfiguring a relocated pluggable database, and, by so doing, reduce the amount of administrator effort required to relocate a pluggable database from a source to a destination container database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts a flowchart for creating a configuration update template and also running commands recorded in the configuration update template over a relocated pluggable database that has a different configuration than the newly hosting container database.

FIG. 5 depicts a flowchart for detecting that a relocated pluggable database is configured for a different DBMS version than the destination container database and, in response, detecting and running an update template that configures the relocated pluggable database for the version of the DBMS for which the destination container database is configured.

DETAILED DESCRIPTION

Figure 1:
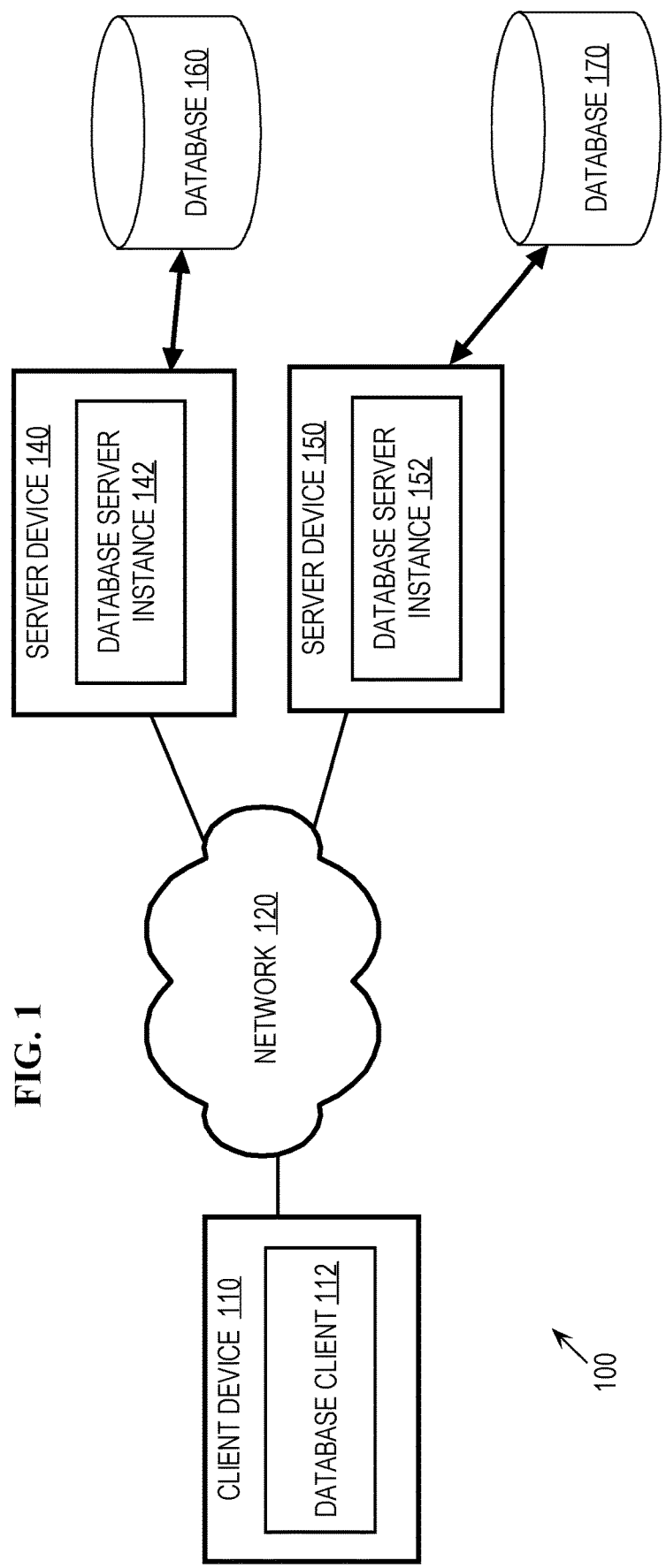
FIG. 1 is a block diagram that depicts an example network arrangement for automatically reconfiguring a relocated pluggable database.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

At times, moving a pluggable database between container databases requires reconfiguring the relocated pluggable database to accommodate the DBMS features applicable to the destination container database. Without such reconfiguration, a relocated pluggable database may not function correctly, since it may not be compatible with or function according to the requirements of the DBMS features that are now applicable to the pluggable database by virtue of its new location in the destination container database.

According to one or more embodiments, a database server instance automatically detects configuration issues when a pluggable database is plugged into a new destination container database. The database server instance identifies one or more update templates, within the destination container database, that, when run over the relocated pluggable database, update the configuration of the pluggable database to conform to the configuration of the destination container database. The database server instance automatically runs the one or more update templates over the pluggable database without requiring any user intervention and without requiring running any update scripts from the DBMS kernel. In this way, the database server instance automatically reconfigures the relocated pluggable database to be compatible with the DBMS features that are applicable to the destination container database.

Instead of requiring an administrator to initiate update scripts from a DBMS kernel every time a relocated pluggable database is configured differently than the destination container database, the DBMS automatically applies, to such a relocated pluggable database, update templates that store configuration commands required to reconfigure the pluggable database.

According to one or more embodiments, the DBMS stores, to update templates, configuration commands run within pluggable databases in connection with system updates initiated by administrators running update scripts from the DBMS kernel to update the system. The DBMS saves these recorded commands to update templates within the container database. These recorded update templates may then be automatically run over relocated pluggable databases to configure the pluggable databases according to the configuration of the destination container database without requiring any update scripts to be run in the DBMS kernel.

According to one or more further embodiments, the update templates may be pre-recorded update templates. Template commands stored in pre-recorded update templates originate from installation source data that is used during initial installation of the DBMS on a given system. In this way, the DBMS may automatically update relocated pluggable databases that are initially configured for a version of the DBMS that pre-dates the version of the DBMS that was initially installed on the system managing the destination container database.

Architecture for Automatically Reconfiguring a Relocated Pluggable Database

FIG. 1 is a block diagram that depicts an example network arrangement for automatically reconfiguring a relocated pluggable database, according to one or more embodiments. Network arrangement 100 includes a client device 110 and server devices 140 and 150 communicatively coupled via a network 120. Example network arrangement 100 may include other devices, including client devices, server devices, storage devices, and display devices, according to one or more embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Client device 110 may be configured with other mechanisms, processes and functionalities, depending upon a particular implementation.

Network 120 may be implemented with any type of medium and/or mechanism that facilitates the exchange of information between client device 110 and one or more of server devices 140 and 150. Furthermore, network 120 may facilitate use of any type of communications protocol, and may be secured or unsecured, depending upon the requirements of a particular embodiment.

According to one or more embodiments, one or both of server devices 140 and 150 implement a single-server database management system. According to one or more embodiments, one or both of server devices 140 and 150 are nodes in distinct clusters of nodes managed by multi-node DBMSs, e.g., shared-everything cluster database environments (such as Oracle Real Application Clusters ("RAC")). (See "Oracle Real Application Clusters (RAC)", An Oracle White Paper, June 2013, Oracle Database 12C documentation. This document is incorporated by reference as if fully set forth herein.) According to one or more embodiments, any number of nodes may be part of a node cluster managed by a multi-node DBMS. Specifically, resources from multiple nodes in a multi-node database system can be allocated to run a particular database server's software.

Server devices 140 and 150 are implemented by any type of computing device that is capable of communicating with client device 110 over network 120 and also capable of running a database server instance. In network arrangement 100, server devices 140 and 150 are configured with database server instances 142 and 152, respectively.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients (such as database client 112 on client device 110).

Database server instance 142 on server device 140 maintains access to and manages data in database 160. Also, database server instance 152 on server device 150 maintains access to and manages data in database 170. According to one or more embodiments, access to a given database comprises access to (a) a set of disk drives storing data for the database, and (b) data blocks stored thereon. Databases 160 and 170 may variously reside in any type of storage, including volatile and non-volatile storage, e.g., random access memory (RAM), one or more hard disks, main memory, etc.

One or more of the functions attributed to processes running on server device 140, and/or 150, as described herein, may be performed by services on other server devices that are communicatively coupled to network 120. Furthermore, any of the functionality attributed to database client 112 and database server instances 142 and 152 herein may be performed by any other logical entity of network arrangement 100, according to one or more embodiments. Also, database server instances 142 and 152 may each be implemented by one or more logical modules, and are described in further detail below. Server devices 140 and 150 may be configured variously with other mechanisms, processes and functionalities, depending upon a particular implementation.

In an embodiment, each of the processes and/or functionality described in connection with database client 112, database server instances 142 and 152, and/or databases 160 and 170 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems. Therefore, a description of a DBMS is useful. A DBMS manages a database. There may be many versions of a given DBMS, including major versions, minor versions, and DBMS patches. There may be differences between versions of a DBMS that require container databases (and the pluggable databases plugged therein) being managed by the different DBMS versions to be configured differently.

A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at client device 110 submits, via database client 112, a database command to database server instance 142 with which database client 112 maintains a connection. A user may be one or more applications running on client device 110 that cause database client 112 to interact with database server instance 142. Multiple parties may access database resources through a given application. Multiple parties and/or users may also be referred to herein, collectively, as a user.

Database Queries

A user may submit database queries to a database session that connects the user to a pluggable database. Such database queries initiate one or more transactions that run over the pluggable database. A database query may be represented by a database statement that conforms to a database language. Furthermore, a user may run a set of database statements over a database, which performs changes within the database.

A database command may be in the form of a database statement that conforms to a database language. Examples of database languages include a Structured Query Language (SQL) that conforms to American National Standards Institute (ANSI) standards, and proprietary forms (e.g. PL/SQL, other proprietary SQL standards, etc.). Data manipulation language (DML) instructions are issued to a DBMS to manage data stored within a database structure, and SELECT, INSERT, UPDATE, and DELETE are common examples of DML instructions found in SQL implementations. Data definition language (DDL) statements are statements that cause performance of one or more of: create, alter, and drop schema objects; grant and revoke privileges and roles; analyze information on a table, index, or cluster; establish auditing options; and add comments to the data dictionary; etc.

Container Database and Pluggable Database Architecture

Figure 2A:
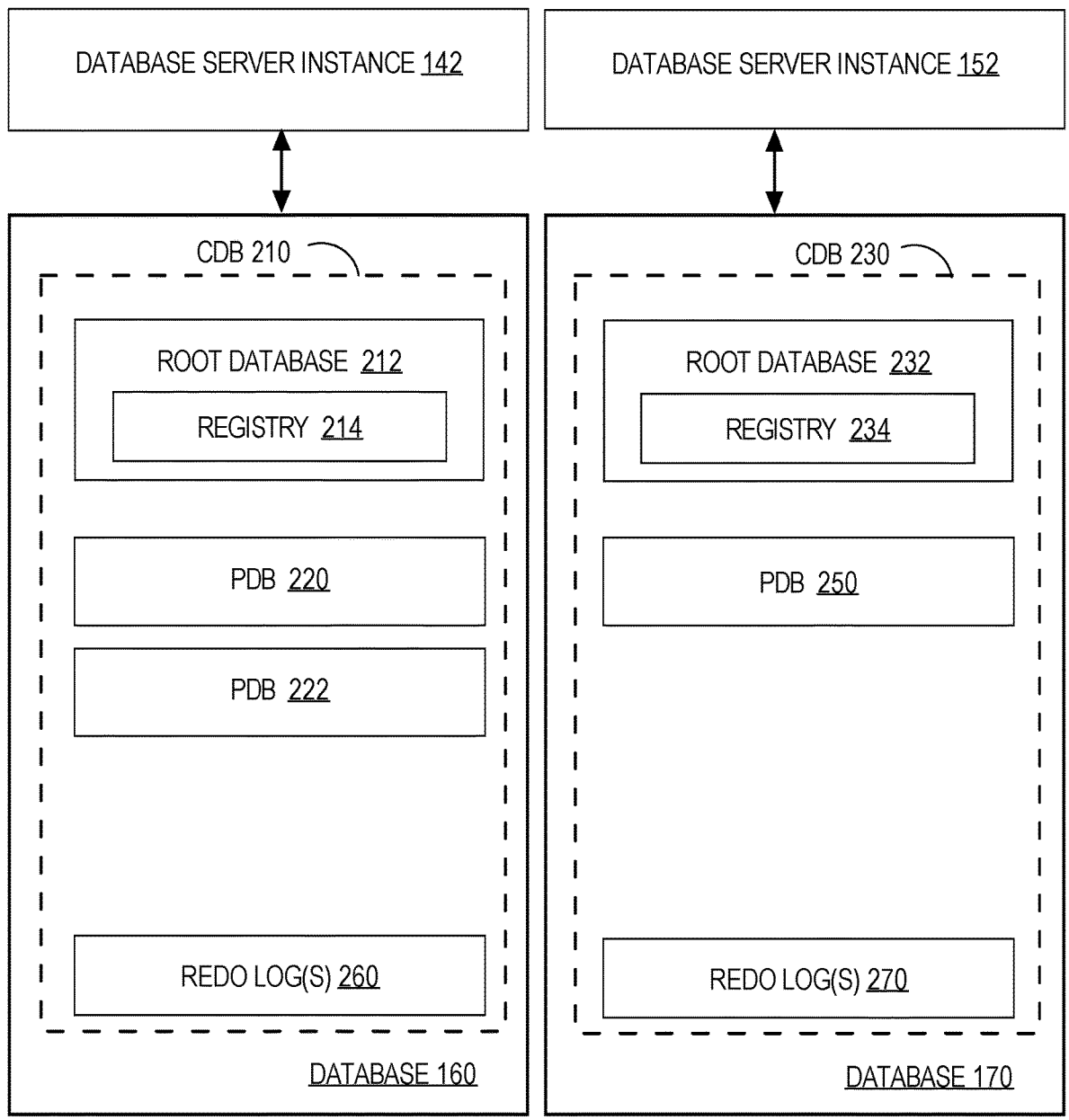
FIGS. 2A-2C depict example resource arrangements of databases.
Figure 2B:
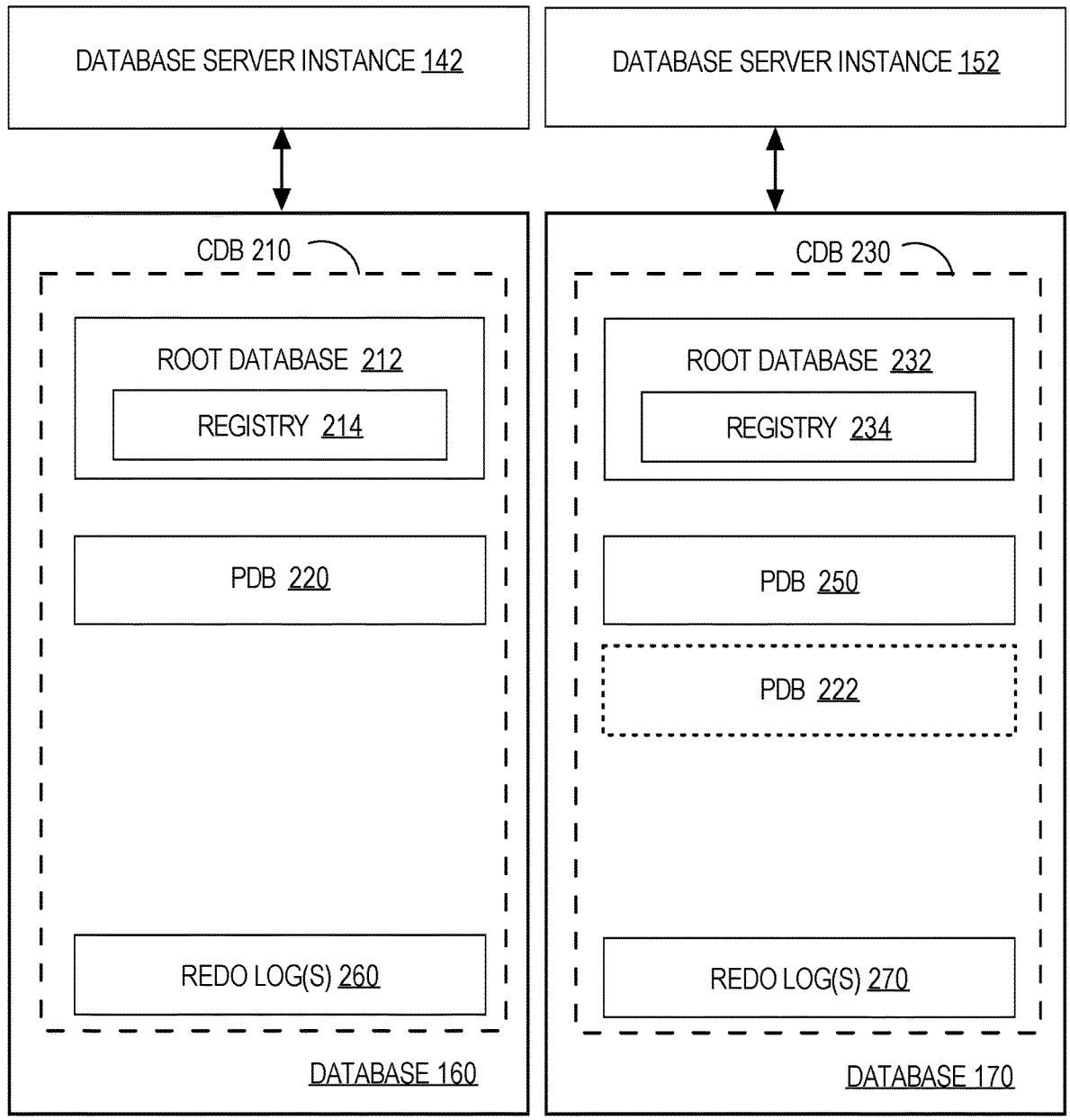
Figure 2C:
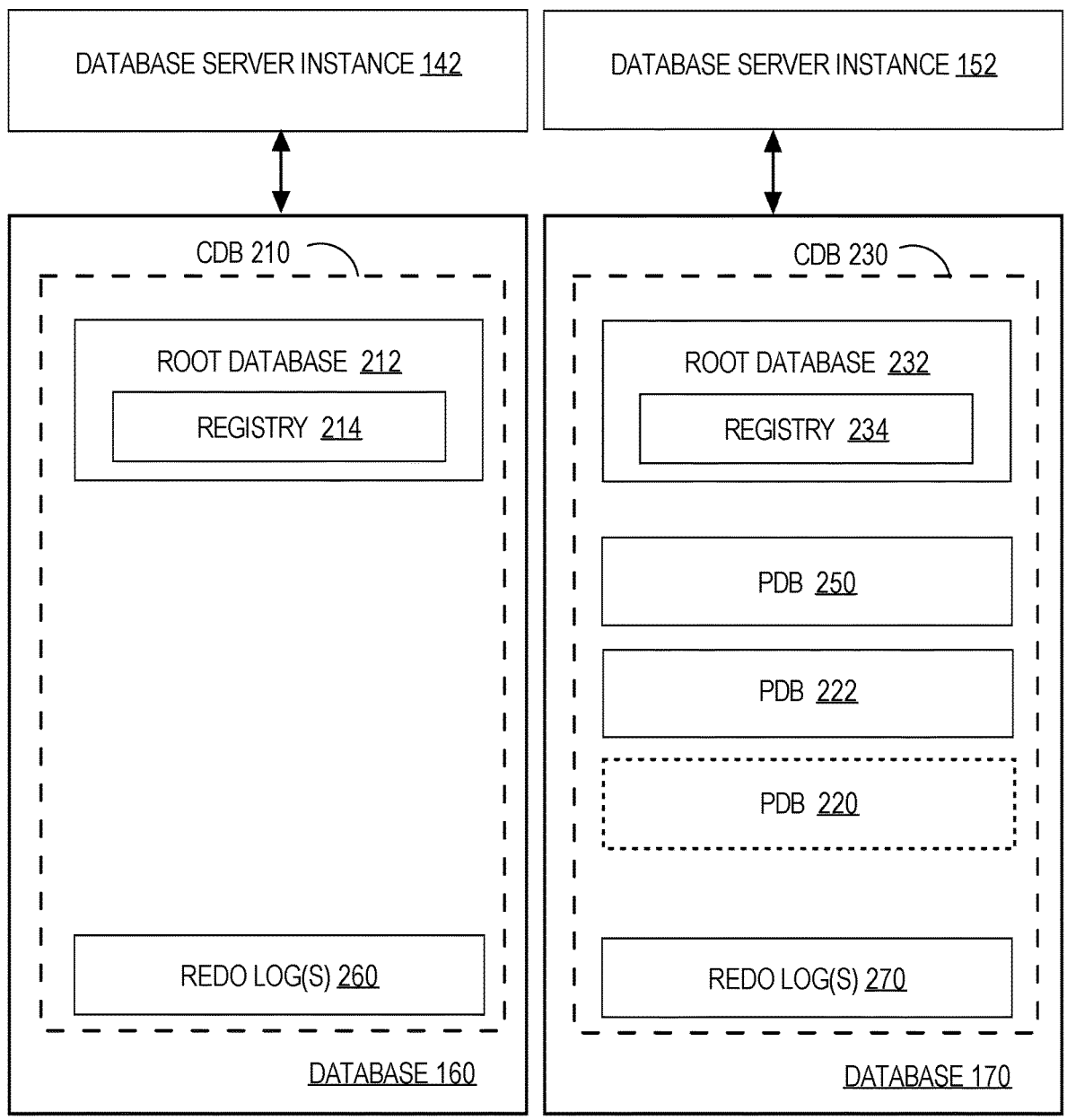

FIGS. 2A-2C depict example resource arrangements of databases 160 and 170. In FIGS. 2A-2C, database 160 includes a root database 212 that represents the data for a CDB 210. CDB 210 is a primary container database that contains zero or more of PDBs 220 and 222. Further, database 170 includes a root database 232 that represents the data for a CDB 230. CDB 230 is a primary database that contains one or more of PDBs 250, 222, and 220. A root database includes a CDB data dictionary, as well as a registry described in further detail below. The depiction of CDBs 210 and 230 are non-limiting; according to one or more embodiments, container databases may include any number of pluggable databases.

Primary container databases, such as CDB 210, are configured to contain multiple pluggable databases and provide in-database virtualization for consolidating the multiple separate pluggable databases. For example, root database 212 is a pluggable database used to globally manage CDB 210, and to store data required to manage access to other PDBs contained in CDB 210. Although root database 212 is depicted in FIG. 2 as a distinct pluggable database that is separate from other database objects, any architectural implementation for storing container database data may be used within embodiments. Furthermore, as depicted in FIGS. 2A-2C, primary container databases also include redo log(s) that record redo entries for the data in the container databases.

Container Database Configuration

One powerful feature of a container database system is that pluggable databases may be moved from one container database to another. Pluggable databases are easily transported between container databases that have the exact same configuration. However, the source and destination container databases of a relocating pluggable database will not always have the exact same applicable DBMS features, and different DBMS features require different database configurations.

For example, database server instance 142 implements a DBMS that is version 1.0.0 (which, according to Semantic Versioning, indicates that the version of the DBMS is major version 1, minor version 0, and patch version 0—or no patches installed). In contrast, database server instance 152 implements a second version of the same DBMS, version 1.2.3 (i.e., major version 1, minor version 2, and patch version 3).

The root database of a container database records information about the configuration of the container database, e.g., in a registry within the root database. Embodiments are described herein where database configuration information, as well as update template information, is stored in such a registry. However, according to one or more embodiments, database configuration information and/or update template information, for a particular container database, is stored at any location accessible to the database server instance that manages the particular container database.

As illustration of a registry within a root database of a CDB, database server instance 142 stores, in registry 214 located in root database 212 of CDB 210, metadata that identifies those DBMS features (e.g., DBMS version 1.0.0 and no optional features) for which CDB 210 is configured. When a container database is configured for particular DBMS features, the pluggable databases that are managed under the container database are also configured for the particular DBMS features. When a pluggable database is configured to accommodate the same DBMS features as a container database, the configuration of the pluggable database conforms to the configuration of the container database. In other words, when a pluggable database is configured to accommodate the same DBMS features as a container database, the configuration version of the pluggable database is the same as the configuration version of the container database.

A container database (and pluggable databases within the container database) are configured for a particular DBMS feature by configuring the CDB according to the requirements of the DBMS feature. The update script that installs a particular DBMS feature includes instructions to configure any container database(s), to which the DBMS features are applicable, for the DBMS feature. According to one or more embodiments, instructions to configure a CDB comprise DDL or DML commands that, e.g., redefine PL/SQL packages, modify the structure of tables, delete or add certain data, create indexes, add constraints, define views, etc.

For example, version 1.2.3 of the DBMS requires a particular "admin" view to be defined within each pluggable database of a container database managed by that version of the DBMS, and previous versions of the DBMS do not require that particular view to be defined in pluggable databases. Thus, the update script for installing DBMS version 1.2.3 includes instructions to create or replace the "admin" view within the pluggable databases that are to be managed by the new DBMS version. As such, when the configuration of a container database is being updated for version 1.2.3 of the DBMS, the DBMS runs configuration commands, over the pluggable databases in the container database, to create or replace the "admin" view.

Thus, a pluggable database that has an "admin" view defined therein (and also has any other features required for version 1.2.3 of the DBMS) is configured for version 1.2.3 of the DBMS. Furthermore, a pluggable database that does not have the "admin" view defined therein (along with all other features required for version 1.2.3 of the DBMS) does not conform to the configuration version required by that DBMS feature.

Automatically Reconfiguring a Pluggable Database

In an example where CDBs 210 and 230 are configured for different DBMS features, moving a pluggable database between CDBs 210 and 230 involves reconfiguring the relocated pluggable database to accommodate the DBMS features applicable to the destination container database. Without such reconfiguration, the relocated pluggable database will not function correctly, since the pluggable database may not be compatible with or function according to the requirements of the DBMS features that are now applicable to the pluggable database by virtue of its new location in CDB 230.

According to one or more embodiments, a database server instance that manages a destination container database automatically detects configuration issues when a relocating pluggable database is plugged into the destination container database. In response to detecting the issues, the database server instance identifies one or more update templates, within the destination container database, that, when run over the relocated pluggable database, will update the configuration of the pluggable database to conform to the configuration of the destination container database. The database server instance automatically runs the one or more update templates over the relocated pluggable database without requiring any user intervention. In this way, the database server instance automatically reconfigures the relocated pluggable database to be compatible with the DBMS features that are applicable to the destination container database.

Configuration Update Templates

Instead of requiring an administrator to initiate update scripts from a DBMS kernel every time a relocated pluggable database is configured differently than the destination container database, the DBMS automatically applies, to such a relocated pluggable database, update templates that store configuration commands required to reconfigure the pluggable database.

According to one or more embodiments, the DBMS stores, to update templates, configuration commands run within pluggable databases in connection with system updates initiated by administrators running update scripts from the DBMS kernel to update the system. The DBMS saves these recorded commands to update templates within the container database. These recorded update templates may then be automatically run over relocated pluggable databases to configure the pluggable databases according to the configuration of the destination container database without requiring any update scripts to be run in the DBMS kernel.

Flowchart 300 of FIG. 3 depicts creating a configuration update template and also running commands recorded in the configuration update template over a relocated pluggable database that has a different configuration than the newly hosting container database. Specifically, at step 302 of flowchart 300, a set of configuration commands are run over a first pluggable database within a container database, where running the set of configuration commands over the first pluggable database changes the configuration of the first pluggable database from a first configuration version to a second configuration version, and where the first configuration version is different from the second configuration version.

For example, while database server instance 152 implements a DBMS version 1.0.0, administrators initiate one or more update scripts within a DBMS kernel running on server device 150. The DBMS runs the one or more update scripts, which cause the DBMS version being implemented by instance 152 to be updated from version 1.0.0 to version 1.2.3. While the "configuration version" in this example refers to the version of the DBMS, any aspect of the configuration of a pluggable database, affecting the features of the DBMS, may encompassed in the "configuration version" of flowchart 300.

Running the one or more update scripts causes instance 152 to run a set of commands (such as SQL statements) over each of the pluggable databases within CDB 230 (including over root database 232) managed by database server instance 152. This set of commands that is run over each pluggable database within CDB 230, in connection with an updating or installing a DBMS feature, are the set of configuration commands referred to in step 302. An example set of commands, run over CDB 230 in connection with updating the version of the DBMS implemented by instance 152 from 1.0.0 to 1.2.3, includes one or more SQL statements to create or replace the "admin" view within the pluggable databases of CDB 230.

At step 304, in response to running the set of configuration commands, the set of configuration commands is recorded into a configuration change template. For example, database server instance 152 includes a configuration command listener that listens for configuration commands being performed within a particular pluggable database of CDB 230. Embodiments herein are described in which the particular pluggable database from which instance 152 gathers configuration commands is root database 232, which is a non-limiting example of the pluggable database in which instance 152 listens for configuration commands.

Figure 4A:
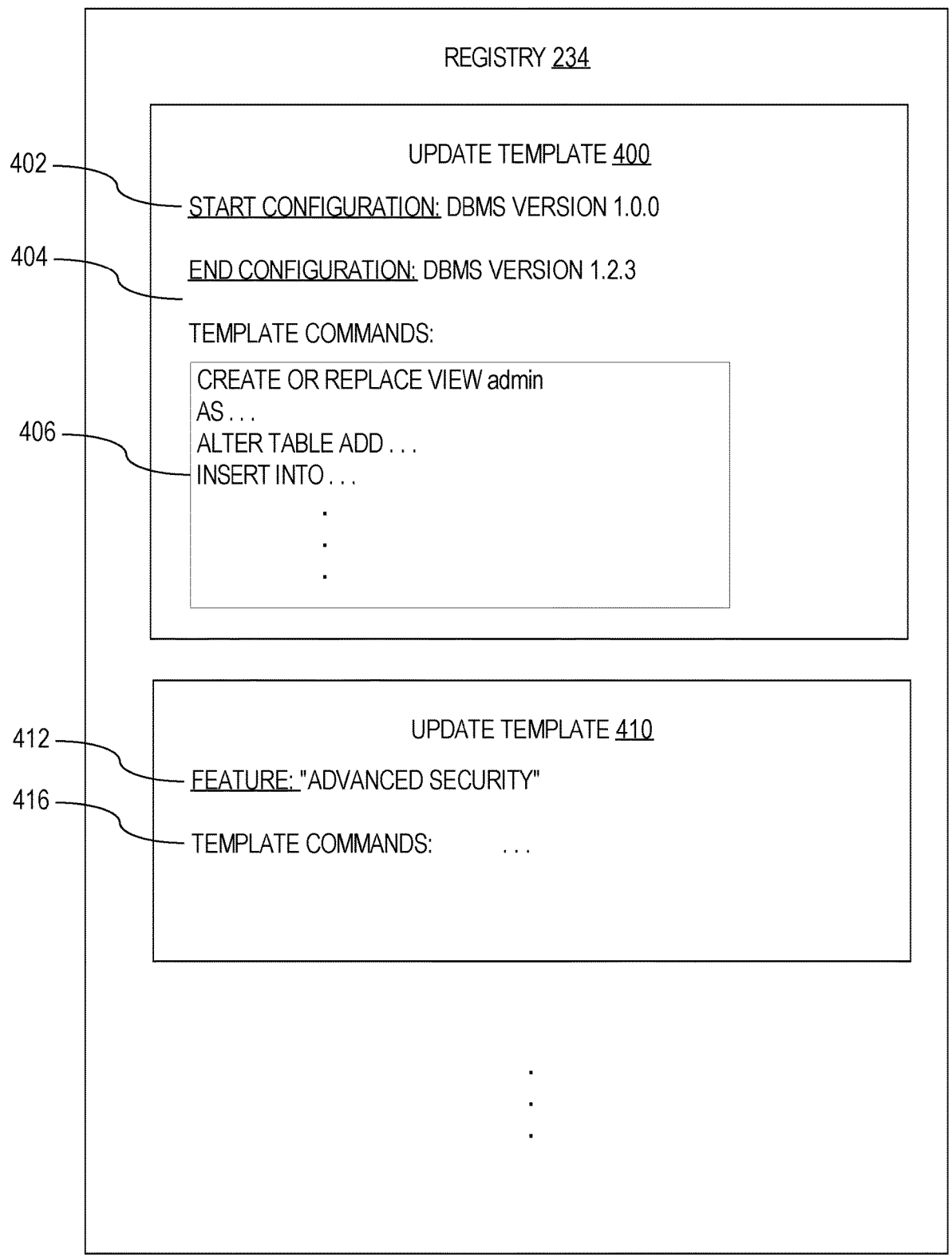
FIGS. 4A-4B depict example update templates within a registry in a root database.
Figure 4B:
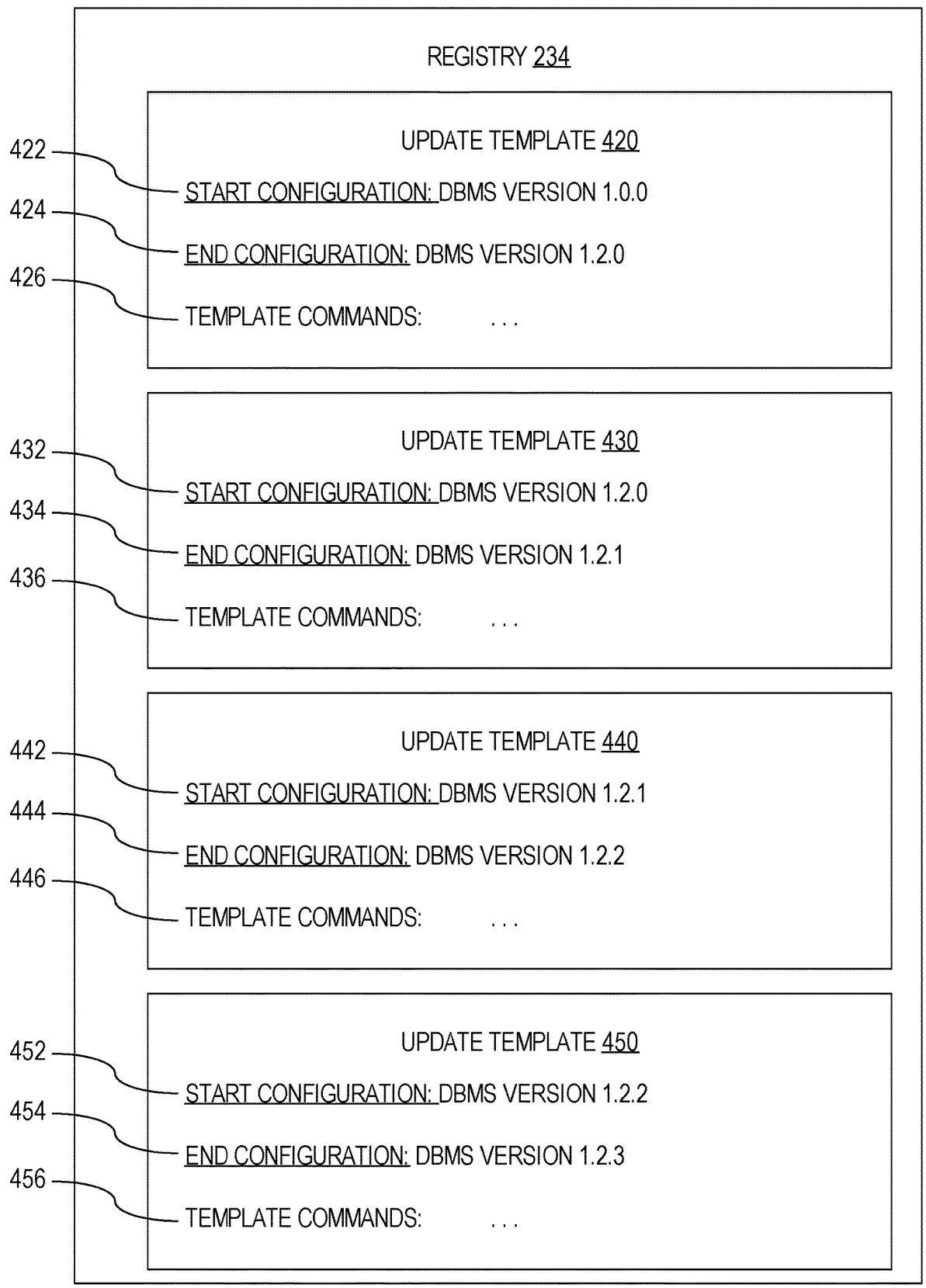

As the set of configuration commands described in connection with step 302 are being executed within root database 232, the configuration command listener in database server instance 152 captures the executed commands. According to one or more embodiments, database server instance 152 records the set of configuration commands that are executed within root database 232 to an update template within registry 234. FIGS. 4A-4B depict example configurations of update templates within registry 234 in root database 232.

According to one or more embodiments, as the set of configuration commands described in connection with step 302 are being executed within root database 232, instance 152 stores the set of configuration commands into a buffer. Instance 152 populates a template (as described below) using the configuration commands stored to the buffer.

For example, instance 152 determines that one or more update scripts, which update the DBMS version being implemented by instance 152 from version 1.0.0 to version 1.2.3, have been initiated, and, in response, creates one or more new tables within registry 234 that represent a new update template 400 (FIG. 4A). The depiction of template 400 in FIG. 4A is a logical depiction of the contents of one or more tables that store data for the update template, and the contents of these tables may be formatted for storage in any way.

Instance 152 records information for update template 400 within the one or more new tables. For example, instance 152 stores, in metadata 402 of template 400, the version of the DBMS feature (which is DBMS version 1.0.0) for which CDB 230 was configured prior to running the update script(s). Instance 152 also stores, in metadata 404, the version of the DBMS feature (which is DBMS version 1.2.3) being installed by the update script(s).

Furthermore, according to embodiments, instance 152 stores, as part of an update template, metadata that is an identifier of the DBMS feature for which the commands recorded in the template are used to configure a pluggable database. For example, update template 400 effectively represents configuration commands for both minor versions 1 and 2 of major version 1 of the DBMS and also batch versions 1, 2, and 3 for DBMS major version 1, minor version 2. Instead of or in addition to metadata 402 and 404 in template 400, instance 152 may store identifiers of the updates being made in the template. DBMS feature identifiers may comprise: a unique DBMS feature identifier, an official name of the feature and/or version and/or patch, a reference to identifying information, etc.

According to one or more embodiments, instance 152 further records, in template commands 406, the configuration commands that are run over root database 232 in connection with updating the DBMS version. Template commands 406 (as depicted in FIG. 4A) depict a non-limiting example of commands that may be recorded by a template. Template commands may include one or more of the following types of commands: CREATE OR REPLACE VIEW; ALTER TABLE ADD (column); CREATE OR REPLACE PACKAGE; INSERT INTO; etc. The template commands of a given update template record all of the commands that were run over root database 232 during a given DBMS feature update. Furthermore, a template may also include other metadata that pertains to the configuration of the database, such as an identifier of a database user that was connected at the time of each statement, etc.

Continuing with the example DBMS update described above, instance 152 runs, in connection with updating the DBMS version from 1.0.0 to 1.2.3, the command to create or replace the "admin" view within root database 232. The configuration command listener of instance 152 captures a representation of the command to create or replace the "admin" view within root database 232 and stores the command representation in template commands 406 of template 400.

Instance 152 also records, in update template 400, any other situation-specific information that the configuration commands require in order to configure the pluggable database, such as: identification of the one or more update scripts that initiated the configuration commands; session settings; user input required by the commands run over root database 232; bind variables; bind values; and any other information applicable to the commands run over root database 232.

As an example of user input that instance 152 records into update template 400, the configuration commands run over root database 232 include commands that request a user to input a username and a password. In addition to storing the configuration commands that request the username and password into template commands 406 in template 400, instance 152 also records, into template 400, the username and password strings that are input by the user in response to these commands. Such situation-specific information is stored such that instance 152 may identify the additional information as being related to any associated recorded configuration commands.

According to one or more embodiments, instance 152 automatically prunes unnecessary configuration commands that are initiated by a given update script. For example, instance 152 detects that running a particular operation, initiated by a particular update script, over root database 232 would not result in any changes to root database 232. Thus, instance 152 prunes the particular operation and, as such, does not run the operation over root database 232 and also does not record the operation in any update template. In this way, instance 152 only runs, over root database 232, and records in an update template, those commands that are required to configure the PDB.

As described in further detail below, since database server instance 152 records (in update templates within registry 234) those configuration commands that are being run over a particular pluggable database, in addition to other information needed during a given DBMS feature update, instance 152 captures all information that is needed to recreate the configuration for another pluggable database without having to run the original update scripts from the DBMS kernel.

Moving and Automatically Updating a Pluggable Database

Returning to flowchart 300, at step 306, while the configuration of the container database conforms to the second configuration version, a second pluggable database is plugged into the container database. According to one or more embodiments, the configuration of a CDB or PDB conforms to a particular configuration version when the CDB is configured according to the requirements of that configuration version. Continuing with the above example, CDB 230 conforms to the configuration version for DBMS version 1.2.3 because CDB 230 is configured to be compatible with DBMS version 1.2.3, as performed by operations run over CDB 230 in connection with the update script for DBMS version 1.2.3.

For purposes of illustration, steps 302-304 are performed while CDB 210 and CDB 230 are in the state depicted by FIG. 2A. Further, as an example of step 306, while database server instance 142 implements DBMS version 1.0.0 and database server instance 152 implements DBMS version 1.2.3, PDB 222 is unplugged from CDB 210 and plugged into CDB 230, as depicted in FIG. 2B. As such, instance 152 plugs PDB 222 into CDB 230.

At step 308, it is automatically detected that the configuration of the second pluggable database conforms to the first configuration version. For example, database server instance 152 determines, from metadata stored within PDB 222, that PDB 222 is configured for DBMS version 1.0.0, which requires a different PDB configuration version than DBMS version 1.2.3 being run by database server instance 152. When instance 152 determines that the configuration of PDB 222 is not compatible with the DBMS features that are applicable to CDB 230, instance 152 puts PDB 222 into restricted mode, which restricts the functionality available for PDB 222.

Database server instance 152 may identify the configuration of a relocated pluggable database in a variety of ways. For example, instance 152 determines that PDB 222 is configured for version 1.0.0 of the DBMS based on metadata for PDB 222 in a PDB-specific database dictionary that states that the PDB is configured for DBMS version 1.0.0. As another example, instance 152 determines that PDB 222 is configured for DBMS version 1.0.0 by detecting that PDB 222 implements features required for version 1.0.0 of the DBMS and/or does not implement features required by other versions of the DBMS.

At step 310, in response to detecting that the configuration of the second pluggable database conforms to the first configuration version, the configuration change template is automatically run over the second pluggable database, where running the configuration change template over the second pluggable database conforms the configuration of the second pluggable database to the second configuration version. For example, in response to detecting that PDB 222 is configured for DBMS version 1.0.0, which is different than the DBMS version that is applicable to CDB 230, instance 152 identifies one or more update templates that store configuration commands to configure a PDB (that is currently configured for DBMS version 1.0.0) for the current version of the DBMS that is applicable to CDB 230, or DBMS version 1.2.3.

According to one or more embodiments, to identify the one or more update templates, instance 152 searches for an update template, within registry 234, that has metadata indicating a starting configuration that is the same as the starting configuration of PDB 222. For example, instance 152 determines that update template 400 has a starting configuration of DBMS version 1.0.0, which is the same starting configuration as PDB 222.

In response to identifying update template 400, instance 152 automatically runs the commands recorded for template 400, in template commands 406, over PDB 222. In other words, instance 152 executes each command recorded in template commands 406 over PDB 222, which causes the configuration of PDB 222 to be updated to conform to the ending configuration version of template 400, which is the configuration version required for DBMS version 1.2.3.

In the case that commands in template commands 406 require additional values, such as user input, session variables, etc., instance 152 identifies, within information for template 400, the additional values stored for the commands. For example, particular commands in template commands 406 require that the user provide a username and password. Instead of asking a user for the username and password while running template commands 406, instance 152 searches for the username and password that the user provided when the template was originally made, and that were stored within data for template 400. Instance 152 uses the username and password values stored within template 400.

According to one or more embodiments, instance 152 determines whether the configuration of PDB 222 now matches the configuration of CDB 230, e.g., by comparing metadata indicating the DBMS features that are applicable to CDB 230 with metadata indicating the configuration version of PDB 222, or by comparing metadata indicating the configuration of CDB 230 with the metadata indicating the ending configuration of the update template that was just run, etc. If the configuration of PDB 222 conforms to the configuration version of CDB 230 after running the commands in template commands 406, then instance 152 changes the mode of PDB 222 from "restricted" to "read-write" and allows users to connect to PDB 222 in CDB 230.

Using Multiple Update Templates

According to one or more embodiments, database server instance 152 detects when individual update scripts are being run (i.e., where each update script represents a particular incremental update to the DBMS, or represents a new optional feature, or represents an incremental update to an optional feature) and stores a template for each individual update script. For example, an administrator runs multiple update scripts (a "batch update"), representing multiple incremental updates to the DBMS implemented by instance 152, in order to update the DBMS version from 1.0.0 to 1.2.3. According to one or more embodiments, instead of storing the configuration commands, caused by all of the update scripts, to a single update template 400 (as depicted in FIG. 4A), database server instance 152 creates a distinct template for each update script that is run to update the DBMS from version 1.0.0 to version 1.2.3.

For example, FIG. 4B depicts a plurality of update templates which, when taken together, include the template commands to update the configuration of a PDB from a DBMS version 1.0.0 configuration to a DBMS version 1.2.3 configuration. In the example of FIG. 4B, administrators have run four update scripts to update the DBMS implemented by instance 152 from DBMS version 1.0.0 to DBMS version 1.2.3. Specifically, the template commands 426 in update template 420 are the configuration commands, run over root database 232, from a first update script that updates the DBMS from version 1.0.0 to version 1.2.0. Subsequent to running the first update script, administrators ran three additional update scripts, the configuration commands for each of which are captured in the template commands for update templates 430, 440, and 450, respectively.

According to the example registry 234 of FIG. 4B, instance 152 updates PDB 222 (which has just been plugged into CDB 230 where PDB 222 is configured for DBMS version 1.0.0 and CDB 230 is configured for DBMS version 1.2.3) by determining that update template 420 matches the starting configuration of PDB 222 and running that template. Instance 152 determines whether an additional update template needs to be run after template 420 successfully completes. In this case, instance 152 determines that further updates need to be performed since the configuration of PDB 222 (for DBMS version 1.2.0) does not yet match the configuration of CDB 230 (for DBMS version 1.2.3).

Instance 152 identifies the next update template in registry 234 that is to be run over PDB 222 to continue updating the configuration of PDB 222. According to one embodiment, instance 152 searches for an update template that has the same starting configuration as PDB 222 (for DBMS version 1.2.0) and runs that update template. According to another embodiment, instance 152 detects information, within update template 420, that identifies an additional update template (i.e., template 430) that represents the next update that the administrators originally ran over root database 232. Thus, in this embodiment, template ordering information is encoded in the multiple update templates created during a batch update and the determination of which update templates should be run (and in what order) need not performed at the time that the batch update is actually being applied to a new PDB.

Instance 152 runs template 430 (identified as next in the batch) over PDB 222, and then determines (as described above) whether an additional update template is required in order to update the configuration of PDB 222 to the configuration version of CDB 230. Instance 152 runs all of the update templates that instance 152 identifies as required to update the configuration of PDB 222 such that the configuration of PDB 222 is made compatible with DBMS version 1.2.3. Specifically, in the example of FIG. 4B, instance 152 also runs templates 440 and 450, in that order, over PDB 222, which configures PDB 222 for version 1.2.3 of the DBMS. When updating a PDB requires application of multiple update templates (stored separately within the CDB registry), the multiple update templates are sub-templates which, together, comprise one logical update template.

Optional Features

According to one or more other embodiments, database server instance 152 stores, to feature-specific templates, commands run over root database 232 in connection with the installation or update of optional features. An optional feature is any feature that is not included in a minimal version of the DBMS, such as a Spatial feature, an Advanced Security feature, a Multimedia feature, etc.

To illustrate, an administrator runs an update script over CDB 230 that implements a new optional feature, "Advanced Security", within CDB 230 of FIG. 2B. The new optional feature requires that all pluggable databases be encrypted. Running the update script causes instance 152 to run certain configuration commands, over CDB 230, that, at least in part, encrypt the data of all of the pluggable databases in CDB 230 of FIG. 2B (i.e., root database 232, PDB 250, and PDB 222).

Instance 152 captures these configuration commands in a feature-specific configuration update template, such as update template 410 depicted in FIG. 4A. Specifically, as instance 152 runs the configuration commands to update CDB 230 with the new "Advanced Security" optional feature, instance 152 records these commands (as described above) in template commands 416 of update template 410.

As depicted in FIG. 4A, update template 410 includes feature metadata 412 that identifies the optional feature ("Advanced Security") for which template commands 416 configure a pluggable database. Update template 410 may, alternatively, indicate a start and end configuration. For example, update template 410 includes metadata indicating a start configuration of "Advanced Security-none" and an end configuration of "Advanced Security". As another example, for a versioned optional feature, update template

410 includes metadata indicating a start configuration of "Advanced Security version 2.0.0" and an end configuration of "Advanced Security version 2.0.1".

The following is an illustration of reconfiguring a relocated pluggable database for DBMS features, applicable to a destination CDB, that include a new DBMS version and an optional feature update. As depicted in FIG. 2C, while CDB 210 is configured for version 1.0.0 of the DBMS (with no optional features) and CDB 230 is configured for version 1.2.3 of the DBMS with the optional feature "Advanced Security", an administrator moves PDB 220 from CDB 210 to CDB 230. As such, instance 152 plugs PDB 220 into CDB 230.

As described in connection with flowchart 300 above, upon plugin of PDB 220, instance 152 determines that the configuration of PDB 220 does not conform to the configuration of CDB 230 and puts PDB 220 into restricted mode. Instance 152 then determines whether there is an update template in registry 234 (as depicted in the example configuration of FIG. 4A) that has the same starting DBMS version as PDB 220. According to embodiments, the determination of matching "start" configurations considers each applicable DBMS feature individually. Instance 152 identifies update template 400 as having the same start configuration for DBMS version as PDB 220 and runs that template over PDB 220. Once that is run, PDB 220 is configured for DBMS version 1.2.3.

At this point, instance 152 determines whether the overall configuration of PDB 220 matches the configuration of CDB 230. The configurations do not match since PDB 220 is still not configured for the "Advanced Security" optional feature (as is CDB 230). Thus, instance 152 searches for another template that configures pluggable databases for the "Advanced Security" optional feature, and, in this way, identifies template 410.

In response to identifying template 410, instance 152 runs template 410 over PDB 220, which configures PDB 220 for the "Advanced Security" optional feature. At this point, instance 152 determines that the configuration of PDB 220 matches the configuration of CDB 230 and changes the mode of PDB 220 from "restricted" to "read-write" mode and allows users to connect to PDB 220 in CDB 230.

Pre-Recorded Templates

At times, a pluggable database is relocated to a container database where the pluggable database is configured for a DBMS version that is less recent than the initially-installed version of the DBMS on the system that manages the destination container database. In that case, the DBMS was never updated from an older version of the DBMS to the initially-installed version of the DBMS. As such, the database server instance that manages the destination container database had no opportunity to record an update template to effectuate reconfiguration of a pluggable database that is configured for the less-recent DBMS version.

Thus, according to one or more embodiments, installation source data, which is the source of information for installation of the initial version of the DBMS, includes one or more pre-recorded update templates that store configuration commands to update the configuration of pluggable databases from less-recent versions of the DBMS to the version of the DBMS being installed. As part of initialization of a CDB that is managed by the DBMS, the DBMS saves, to the registry of the CDB, the one or more pre-recorded update templates. These pre-recorded update templates may be used in the same way as update templates recorded by a database server instance described above. In this way, a CDB may be configured to perform configuration updates, to pluggable databases, that have never before been performed within the CDB.

Flowchart 500 in FIG. 5 depicts detecting that a relocated pluggable database is configured for a different DBMS version than the destination container database and, in response, detecting and running an update template that configures the relocated pluggable database for the version of the DBMS for which the destination container database is configured.

Specifically, at step 502, a pluggable database is plugged into a container database, where the container database is managed by a database management system, while: the container database is configured for a first version of the database management system, and the pluggable database is configured for a second version of the database management system, wherein the first version of the database management system is a more recent version than the second version of the database management system. For example, a CDB 230 (of FIG. 2A) is configured for a DBMS version 1.2.3. While instance 152 implements DBMS version 1.2.3, PDB 222 (configured for DBMS version 1.0.0), is unplugged from CDB 210 and plugged into CDB 230, as depicted in FIG. 2B.

At step 504, after plugging the pluggable database into the container database, it is automatically detected that the configuration of the pluggable database is different than the configuration of the container database. For example, as described in connection with flowchart 300 above, instance 152 detects that PDB 222 is configured for a different version of the DBMS than is CDB 230. According to one or more embodiments, steps 506-508 are performed in response to detecting that the configuration of the pluggable database is different than the configuration of the container database.

At step 506, a configuration change template, that includes commands to configure a pluggable database for the first version of the database management system, is identified within information for the container database. For example, instance 152 determines that update template 400, of FIG. 4A, has a starting configuration of version 1.0.0 of the DBMS (which is the version for which PDB 222 is configured) and an ending configuration of version 1.2.3 of the DBMS (which is the version for which CDB 230 is configured). A single template is described herein, however, multiple sub-templates may be used as a single logical template, as indicated above.

According to one or more embodiments, as described in detail above, template 400 is recorded by instance 152 when CDB 230 is updated from DBMS version 1.0.0 to DBMS version 1.2.3.

However, according to one or more other embodiments, CDB 230 is created while instance 152 implements version 1.2.3 of the DBMS. This is considered an initial installation of the DBMS with respect to CDB 230. Alternatively, instance 152 was initialized as implementing DBMS version 1.2.3 (i.e., the initial installation of the DBMS for instance 152 was DBMS version 1.2.3). In these embodiments, since CDB 230 was never updated from being configured for DBMS version 1.0.0 to being configured for DBMS version 1.2.3, the instance 152 never had an opportunity to record an update template for such an update. In these embodiments, template 400 is a pre-recorded template that is stored to registry 234 by the DBMS as part of setting up CDB 230.

At step 508, the configuration change template is run over the pluggable database, where running the configuration change template over the pluggable database conforms the configuration of the pluggable database for the first version of the database management system. For example, instance 152 runs template commands 406 in pre-recorded update template 400 over PDB 222, which configures PDB 222 for DBMS version 1.2.3.

User Input for a Built-in Update Template

Configuring a pluggable database for a given DBMS feature can require situation-specific data that cannot be pre-recorded, such as: user input, session-specific values, system-specific values, etc. According to one or more embodiments, pre-recorded templates include default values for situation-specific data. In these embodiments, the DBMS may require the user to reset one or more of the default values (such as default user names or passwords) for any PDB on which the pre-recorded template that uses such default values is run.

According to one or more further embodiments, upon initial installation of a DBMS feature, the DBMS tracks the situation-specific data, gleaned from user input or system or session values, that is needed for the pre-recorded templates. Once registry 234 of CDB 230 is set up, instance 152 stores the situation-specific data to a table within the registry.

In such embodiments, when pre-recorded templates are run over pluggable databases within CDB 230, instead of using default values for variables, the DBMS uses the stored situation-specific data that the DBMS gathered during the initial installation of the relevant DBMS feature. Thus, the appropriate situation-specific values used during the initial installation of the DBMS feature are propagated to the configurations of the newly plugged-in PDBs, which potentially reduces, even further, the work required by administrators in connection with moving pluggable databases between container databases.

Additional Embodiments

According to one or more embodiments, administrators configure a particular CDB to indicate what configuration updates should be automatically performed for PDBs that are plugged into the CDB. For example, administrators of CDB 230 access, via instance 152, a list of automatic configuration updates or types of automatic configuration updates that are available for PDBs that are relocated to CDB 230. Administrators may indicate, on the list, that particular configuration updates or update types should or should not be automatically performed. List data may be stored in CDB 230, e.g., in registry 234, as metadata for the update templates or in a control file within registry 234. When a relocated PDB is plugged into CDB 230, instance 152 only performs those automatic configuration updates, on the relocated PDB, that are both applicable to the PDB and allowed/required by administrators.

The DBMS may record, in a template, instructions that are run within a root database while installing or rolling back an independently-installed patch. Thus, when a relocated PDB is plugged into a CDB in which an independently-installed patch is installed, the DBMS may use a template recorded for installing the patch to install the patch in the relocated PDB. Furthermore, if a particular patch is installed in the relocated PDB but not in the new host CDB, the DBMS may use a template recorded for rolling back the particular patch to roll back the installation of the particular patch in the relocated PDB.

Furthermore, a DBMS may store, in a template, instructions for syncing common users and privileges that exist in a particular CDB. Thus, when a relocated PDB is plugged into the particular CDB, the DBMS may use the template, recorded for syncing the common users and privileges, to sync the common users and privileges in the relocated PDB.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
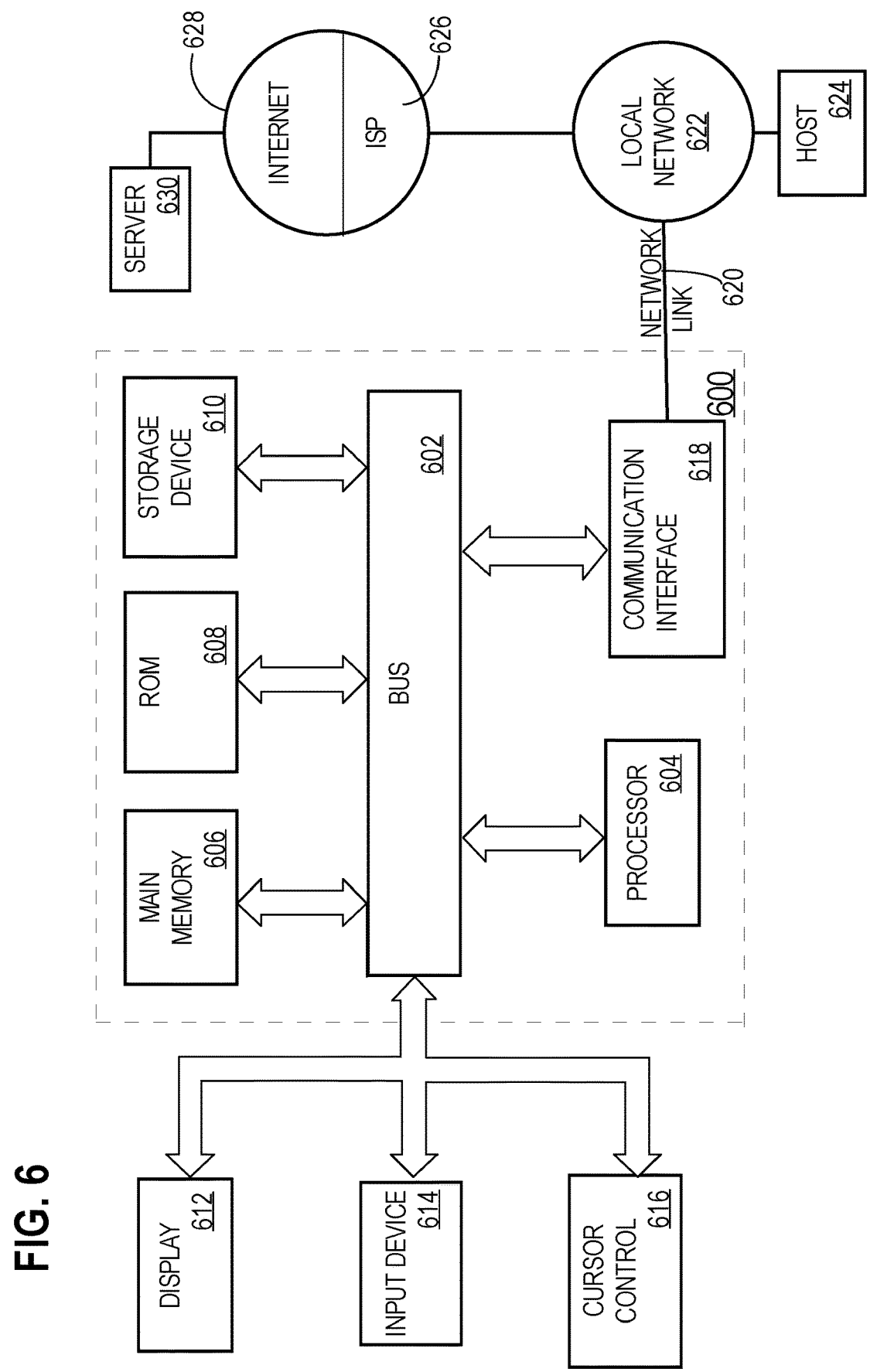
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   running a set of configuration commands over a first pluggable database within a container database;
   wherein running the set of configuration commands over the first pluggable database changes a configuration of the first pluggable database from a first configuration version to a second configuration version;
   wherein running the set of configuration commands is in connection with an initial installation of the second configuration version for the container database;
   wherein the first configuration version is different from the second configuration version;
   in response to running the set of configuration commands, automatically recording the set of configuration commands into a configuration change template;
   while a configuration of the container database conforms to the second configuration version, plugging a second pluggable database into the container database;
   automatically detecting that a configuration of the second pluggable database conforms to the first configuration version;
   in response to detecting that the configuration of the second pluggable database conforms to the first configuration version, automatically running the configuration change template over the second pluggable database;
   wherein running the configuration change template over the second pluggable database conforms the configuration of the second pluggable database to the second configuration version;
   during the initial installation of the second configuration version, receiving user input;
   wherein the user input is utilized during the initial installation;
   recording the user input to produce recorded user input; and
   while running the configuration change template over the second pluggable database:

detecting that a particular command in the configuration change template requires particular user input, and in response to detecting that the particular command in the configuration change template requires particular user input, retrieving the particular user input from the recorded user input;

wherein the method is performed by one or more computing devices.

2. The computer-executed method of claim 1, wherein:

recording the user input to produce recorded user input is performed in connection with recording the particular command of the set of configuration commands; and the user input is provided in connection with running the particular command.

3. The computer-executed method of claim 1, wherein:

the configuration change template comprises two sub-templates;

automatically running the configuration change template over the second pluggable database comprises:

running a first sub-template over the second pluggable database;

after running the first sub-template, determining whether the configuration of the second pluggable database conforms to the second configuration version;

in response to determining that the configuration of the second pluggable database does not conform to the second configuration version after running the first sub-template: running a second sub-template over the second pluggable database;

the first sub-template includes a first subset of the set of configuration commands and the second sub-template includes a second subset of the set of configuration commands.

4. The computer-executed method of claim 3, wherein:

the first sub-template includes commands for configuring a pluggable database for a particular version of a database management system; and the second sub-template includes commands for configuring a pluggable database for an optional database feature.

5. The computer-executed method of claim 3, wherein:

metadata for the first sub-template includes information identifying the second sub-template; and the method further comprises, before running the second sub-template over the second pluggable database, identifying the second sub-template based, at least in part, on the information identifying the second sub-template in the metadata for the first sub-template.

6. The computer-executed method of claim 1, wherein the container database includes a root database that is different than the first pluggable database and the second pluggable database.

7. A computer-executed method comprising:

plugging a pluggable database into a container database, where the container database is managed by a database management system, while:

the container database is configured for a first version of the database management system, and the pluggable database is configured for a second version of the database management system, wherein the first version of the database management system is a more recent version than the second version of the database management system;

after plugging the pluggable database into the container database, automatically detecting that a configuration of the pluggable database is different than a configuration of the container database;

in response to detecting that the configuration of the pluggable database is different than the configuration of the container database:

identifying a configuration change template that includes commands to configure a pluggable database for the first version of the database management system, and running the configuration change template over the pluggable database, wherein running the configuration change template over the pluggable database conforms the configuration of the pluggable database for the first version of the database management system;

during an initial installation of the first version of the database management system, receiving user input;

wherein the user input is utilized during the initial installation;

recording the user input to produce recorded user input; and while running the configuration change template over the pluggable database:

detecting that a particular command in the configuration change template requires particular user input, and in response to detecting that the particular command in the configuration change template requires particular user input, retrieving the particular user input from the recorded user input;

wherein the method is performed by one or more computing devices.

8. The computer-executed method of claim 7, wherein:

the initial installation of the first version of the database management system is based on installation source data;

the installation source data includes template commands for the configuration change template;

the method further comprises creating the configuration change template with the template commands, for the configuration change template, in the installation source data.

9. One or more non-transitory computer-readable media storing one or more sequences of instructions that, when executed by one or more processors, cause:

running a set of configuration commands over a first pluggable database within a container database;

wherein running the set of configuration commands over the first pluggable database changes a configuration of the first pluggable database from a first configuration version to a second configuration version;

wherein running the set of configuration commands is in connection with an initial installation of the second configuration version for the container database;

wherein the first configuration version is different from the second configuration version;

in response to running the set of configuration commands, automatically recording the set of configuration commands into a configuration change template;

while a configuration of the container database conforms to the second configuration version, plugging a second pluggable database into the container database;

automatically detecting that a configuration of the second pluggable database conforms to the first configuration version;

in response to detecting that the configuration of the second pluggable database conforms to the first configuration version, automatically running the configuration change template over the second pluggable database;

wherein running the configuration change template over the second pluggable database conforms the configuration of the second pluggable database to the second configuration version;

during the initial installation of the second configuration version, receiving user input;

wherein the user input is utilized during the initial installation;

recording the user input to produce recorded user input; and while running the configuration change template over the second pluggable database:

detecting that a particular command in the configuration change template requires particular user input, and in response to detecting that the particular command in the configuration change template requires particular user input, retrieving the particular user input from the recorded user input.

10. The one or more non-transitory computer-readable media of claim 9, wherein:

recording the user input to produce recorded user input is performed in connection with recording the particular command of the set of configuration commands; and the user input is provided in connection with running the particular command.

11. The one or more non-transitory computer-readable media of claim 9, wherein:

the configuration change template comprises two sub-templates;

automatically running the configuration change template over the second pluggable database comprises:

running a first sub-template over the second pluggable database;

after running the first sub-template, determining whether the configuration of the second pluggable database conforms to the second configuration version;

in response to determining that the configuration of the second pluggable database does not conform to the second configuration version after running the first sub-template: running a second sub-template over the second pluggable database;

the first sub-template includes a first subset of the set of configuration commands and the second sub-template includes a second subset of the set of configuration commands.

12. The one or more non-transitory computer-readable media of claim 11, wherein:

the first sub-template includes commands for configuring a pluggable database for a particular version of a database management system; and the second sub-template includes commands for configuring a pluggable database for an optional database feature.

13. The one or more non-transitory computer-readable media of claim 11, wherein:

metadata for the first sub-template includes information identifying the second sub-template; and the one or more sequences of instructions further comprise instructions that, when executed by one or more processors, cause, before running the second sub-template over the second pluggable database, identifying the second sub-template based, at least in part, on the information identifying the second sub-template in the metadata for the first sub-template.

14. The one or more non-transitory computer-readable media of claim 9, wherein the container database includes a root database that is different than the first pluggable database and the second pluggable database.

15. One or more non-transitory computer-readable media storing one or more sequences of instructions that, when executed by one or more processors, cause:

plugging a pluggable database into a container database, where the container database is managed by a database management system, while:

the container database is configured for a first version of the database management system, and the pluggable database is configured for a second version of the database management system, wherein the first version of the database management system is a more recent version than the second version of the database management system;

after plugging the pluggable database into the container database, automatically detecting that a configuration of the pluggable database is different than a configuration of the container database;

in response to detecting that the configuration of the pluggable database is different than the configuration of the container database:

identifying a configuration change template that includes commands to configure a pluggable database for the first version of the database management system, and running the configuration change template over the pluggable database, wherein running the configuration change template over the pluggable database conforms the configuration of the pluggable database for the first version of the database management system;

during an initial installation of the first version of the database management system, receiving user input;

wherein the user input is utilized during the initial installation;

recording the user input to produce recorded user input; and while running the configuration change template over the pluggable database:

detecting that a particular command in the configuration change template requires particular user input, and in response to detecting that the particular command in the configuration change template requires particular user input, retrieving the particular user input from the recorded user input.

16. The one or more non-transitory computer-readable media of claim 15, wherein:

the initial installation of the first version of the database management system is based on installation source data;

the installation source data includes template commands for the configuration change template;

the one or more sequences of instructions further comprise instructions that, when executed by one or more processors, cause creating the configuration change template with the template commands, for the configuration change template, in the installation source data.

* * * * *

UNITED STATES PATENT AND TRADEMARK OFFICE
CERTIFICATE OF CORRECTION

PATENT NO. : 10,621,176 B2  
APPLICATION NO. : 15/266030  
DATED : April 14, 2020  
INVENTOR(S) : Yam et al.

Page 1 of 1

It is certified that error appears in the above-identified patent and that said Letters Patent is hereby corrected as shown below:

On the Title Page

Item [72], delete "San Franciso," and insert -- San Francisco, --, therefor.

In the Drawings

On Drawing sheet 8 of 9, in FIG. 5, under Reference Numeral 504, Line 1, delete "THEPLUGGABLE" and insert -- THE PLUGGABLE --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*